(12) United States Patent
Goodson

(10) Patent No.: US 12,504,344 B2
(45) Date of Patent: Dec. 23, 2025

(54) LIQUID COOLING LEAK SENSOR

(71) Applicant: Dell Products L.P., Round Rock, TX (US)

(72) Inventor: Simon A. Goodson, Lockhart, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 17/865,118

(22) Filed: Jul. 14, 2022

(65) Prior Publication Data

US 2024/0019335 A1    Jan. 18, 2024

(51) Int. Cl.
*G01M 3/18* (2006.01)
*H05K 7/20* (2006.01)

(52) U.S. Cl.
CPC ........ *G01M 3/186* (2013.01); *H05K 7/20272* (2013.01)

(58) Field of Classification Search
CPC ........ G01M 3/186; G01M 3/16; G01M 3/165; H05K 7/20272; H05K 7/20281; H01L 23/473; H01L 23/3736; G06F 1/20
See application file for complete search history.

(56) References Cited

U.S. PATENT DOCUMENTS

| | | | | |
|---|---|---|---|---|
| 4,922,232 A | * | 5/1990 | Bosich | G01M 3/045 200/61.04 |
| 5,182,941 A | * | 2/1993 | Frenkel | G01M 3/12 73/40 |
| 6,069,070 A | * | 5/2000 | Labunov | H01L 23/3121 257/E23.125 |
| 6,112,579 A | * | 9/2000 | Tryba | G01M 3/18 73/49.1 |
| 9,880,065 B1 | * | 1/2018 | Miguez | F04B 39/041 |
| 2005/0092070 A1 | * | 5/2005 | Bhatti | G01M 3/045 73/40 |
| 2007/0044940 A1 | * | 3/2007 | Shiozawa | G06F 1/1632 165/104.31 |
| 2011/0067773 A1 | * | 3/2011 | Ambrose | G01M 3/28 137/861 |
| 2011/0214490 A1 | * | 9/2011 | Sakita | G08B 21/20 73/73 |
| 2012/0180979 A1 | * | 7/2012 | Harrington | H05K 7/20272 165/96 |

(Continued)

*Primary Examiner* — Jayprakash N Gandhi
*Assistant Examiner* — Jeffrey Francis Stoll
(74) *Attorney, Agent, or Firm* — Larson Newman, LLP

(57) ABSTRACT

A liquid cooling leak sensor unit for an information handling system includes a cold liquid reservoir, a non-conductive material, a rigid conductive component, a wicking material, and a leak sense controller board. The non-conductive material is in physical communication with the cold liquid reservoir. The rigid conductive component is in physical communication with the non-conductive material. The wicking material is in between and in physical communication with both the cold liquid reservoir and with the rigid conductive component. The wicking material transfers liquid from the cold liquid reservoir to the rigid conductive component. The leak sense controller board is coupled to both the rigid conductive component and the cold liquid reservoir. The leak sense controller board detects a leak in the cold liquid reservoir in response to an electrical change between the rigid conductive component and the cold liquid reservoir.

10 Claims, 4 Drawing Sheets

(56) References Cited

U.S. PATENT DOCUMENTS

| | | | |
|---|---|---|---|
| 2014/0071616 A1* | 3/2014 | Watanabe | H05K 7/20772 |
| | | | 361/679.47 |
| 2014/0251583 A1* | 9/2014 | Eriksen | H05K 7/20772 |
| | | | 165/104.33 |
| 2019/0195533 A1* | 6/2019 | Gardner | G01M 3/40 |
| 2019/0368832 A1* | 12/2019 | Huang | G06F 1/20 |
| 2020/0256758 A1* | 8/2020 | Mundt | G01M 3/40 |
| 2020/0378858 A1 | 12/2020 | Curtis et al. | |
| 2021/0088404 A1 | 3/2021 | Li et al. | |
| 2021/0385970 A1 | 12/2021 | Su et al. | |
| 2022/0034743 A1* | 2/2022 | Acharya | G01M 3/18 |

\* cited by examiner

LIQUID COOLING LEAK SENSOR

FIELD OF THE DISCLOSURE

The present disclosure generally relates to information handling systems, and more particularly relates to a liquid cooling leak sensor for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A liquid cooling leak sensor unit for an information handling system includes a liquid reservoir, a non-conductive material, a rigid conductive component, a wicking material, and a leak sense controller board. The liquid reservoir may be a cold liquid reservoir for a cold plate, a catch tray, or the like. The non-conductive material is in physical communication with the cold liquid reservoir. The rigid conductive component is in physical communication with the non-conductive material. The wicking material is in between and in physical communication with both the cold liquid reservoir and with the rigid conductive component. The wicking material may transfer liquid from the cold liquid reservoir to the rigid conductive component. The leak sense controller board is coupled to both the rigid conductive component and the cold liquid reservoir. The leak sense controller board may detect a leak in the cold liquid reservoir in response to an electrical change between the rigid conductive component and the cold liquid reservoir.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
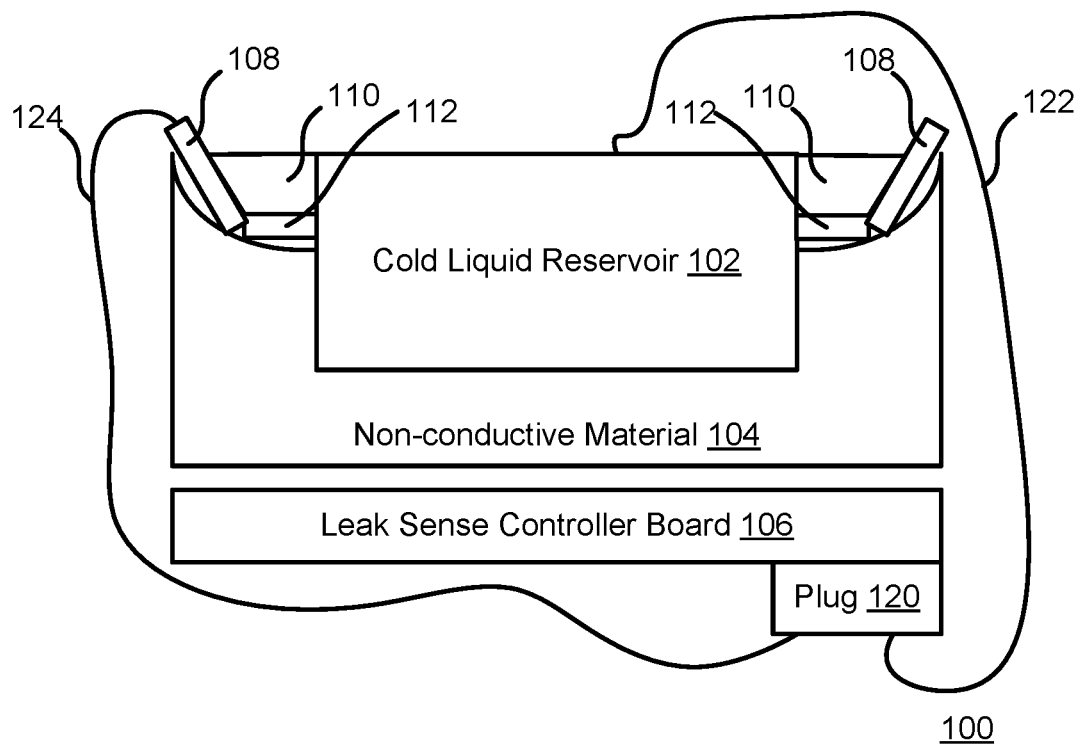
FIGS. 1-4 are schematic cross-sectional views of multiple embodiments of a liquid cooling reservoir with a liquid cooling leak sensor for an information handling system according to at least one embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

FIGS. 1-4 show different embodiments of liquid cooling leak sensor unit 100 of a cooling distribution unit or other liquid cooling devices in an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Liquid cooling leak sensor unit 100 includes a cold liquid reservoir 102, a non-conductive material 104, a leak sense controller board 106, a conductive layer 108, a wicking material 110, and an adhesive 112. Leak sense controller board 106 includes a plug 120, which in turn provides an electrical connection to cold liquid reservoir 102 and conductive material 104. Cold liquid reservoir 102 is electrically coupled to plug 120 via a cable 122, and rigid conductive material 104 is electrically coupled to plug 120 via a cable 124. Cold liquid reservoir 102 may be placed in physical communication with a processor of an information handling system, such as processor 602 or 604 of information handling system 600 in FIG. 6. In this example, cold liquid reservoir 102 may be a cold plate to provide liquid cooling for the processor. In an example, if cooling liquid leaks from cold liquid reservoir 102, the leaked cooling liquid may cause conductors in the information handling system, such as a processor, to short.

In previous information handling systems, a leak sense rope may be placed in a channel around the base of a cold plate for a processor. In these previous information handling systems, the leak sense rope may be utilized to detect leaked cooling liquid. The leak sense rope may include an inner braiding around the conductors of the leak sense rope individually and an outer braiding around both of the conductors. However, a bend radius of the leak sense rope around the channel may cause the braiding to move, which in turn may short the conductors of the leak sensor rope together or may short a single conductor to the cold plate. In this situation, the short in the leak sense rope may emulate a short caused by a leaked cooling liquid. Liquid cooling leak sensor unit 100 is improved by conductive material 108 being a rigid material to prevent bending, which in turn prevents shorts in the conductive material that may emulate detection of a leaked cooling liquid.

In certain examples, cold liquid reservoir 102 may be any conductive material to transfer heat from a processor to the cooling liquid within the cold liquid reservoir. For example, cold liquid reservoir 102 may be copper or the like. In an example, conductive material 108 may be any suitable type of rigid conductive layer on non-conductive material 104. For example, conductive material 108 may be a pre-cut conductive foil material, a conductive paint, or the like. In certain examples, wicking material 110 may be any suitable material capable of effectively transferring leaked cooling liquid from cold liquid reservoir 102 to conductive component 108. For example, wicking material 110 may be felt, cotton fibers, or the like.

In an example, a gap between cold liquid reservoir 102 and conductive material 108 may be controlled based on a size of the conductive material. For example, if conductive component 108 is a conductive paint, the number of coats added to non-conductive material 104 may control the distance or gap between the conductive component and cold liquid reservoir 102. In another example, if conductive component 108 is a pre-cut metal foil, the thickness of the metal foil may control the distance or gap between the conductive component and cold liquid reservoir 102. In different embodiments, the physical locations of cold liquid reservoir 102, non-conductive material 104, rigid conductive component 108, wicking material 110, and adhesive 112 with respect to one another within liquid cooling leak sensor unit 100 may vary from embodiment to embodiment as illustrated in FIGS. 1-4.

Referring to FIG. 1, cold liquid reservoir 102 may be located in the center of non-conductive material 104. In this embodiment, non-conductive material 104 may curve up and away from the edges of the cold liquid reservoir 102. Rigid conductive component 108 may be in physical communication with the curve surface of non-conductive material 104. In an example, conductive component 108 may be located a particular distance from cold liquid reservoir 102 such that the conductive component does not come in physical contact with the cold liquid reservoir. In the embodiment of FIG. 1, adhesive 112 may be located on non-conductive material 104 substantially next to cold liquid reservoir 102. In this situation, when wicking material 110 is attached to non-conductive material 104 via adhesive 112, the wicking material may be in between and in physical communication with both cold liquid reservoir 102 and conductive component 108. In an example, wicking material 110 may fill the entire gap between cold liquid reservoir 102 and conductive component 108 so that any leaked cooling liquid may be effectively transferred from the cold liquid reservoir to the conductive component.

Figure 2:
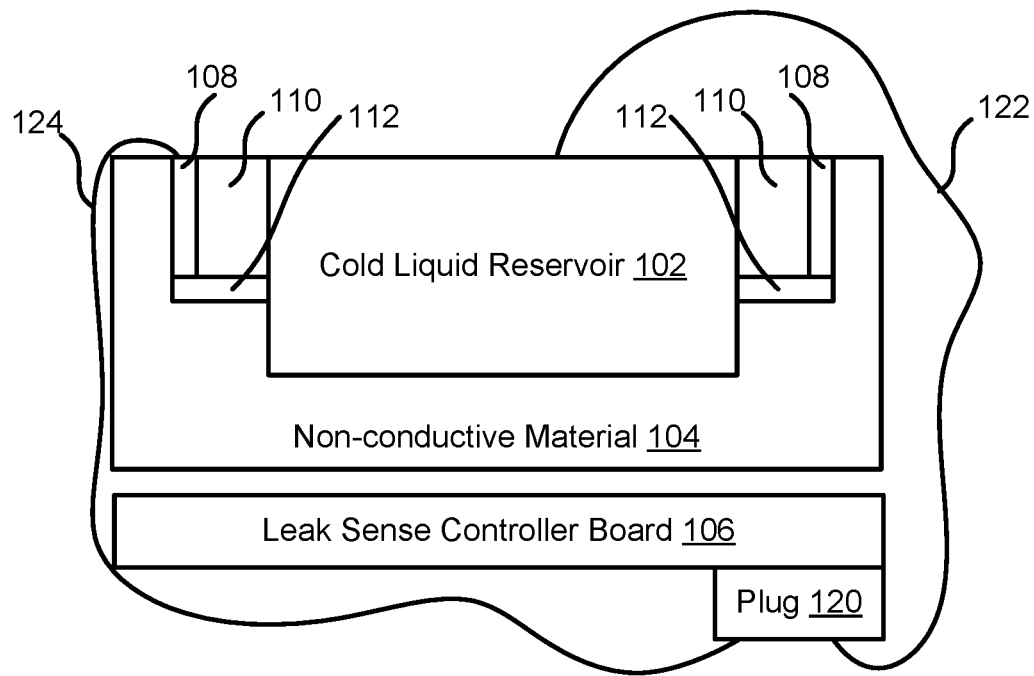

Referring to FIG. 2, cold liquid reservoir 102 may be located in the center of non-conductive material 104. In this embodiment, non-conductive material 104 may extend away from the edges of cold liquid reservoir 102 for a particular distance and then extend parallel with the edges of the cold liquid reservoir. Rigid conductive component 108 may be in physical communication with a surface of non-conductive material 104 that extends parallel with cold liquid reservoir 102, such that a gap is created between the conductive component 108 and the cold liquid reservoir. In the embodiment of FIG. 2, adhesive 112 may be located on non-conductive material 104 in the bottom of the gap between cold liquid reservoir 102 and conductive component 108 and also located substantially next to the cold liquid reservoir. In this situation, when wicking material 110 is attached to non-conductive material 104 via adhesive 112, the wicking material may be in between and in physical communication with both cold liquid reservoir 102 and conductive component 108. In an example, wicking material 110 may fill the entire gap between cold liquid reservoir 102 and conductive component 108 so that any leaked cooling liquid may be effectively transferred from the cold liquid reservoir to the conductive component.

Figure 3:
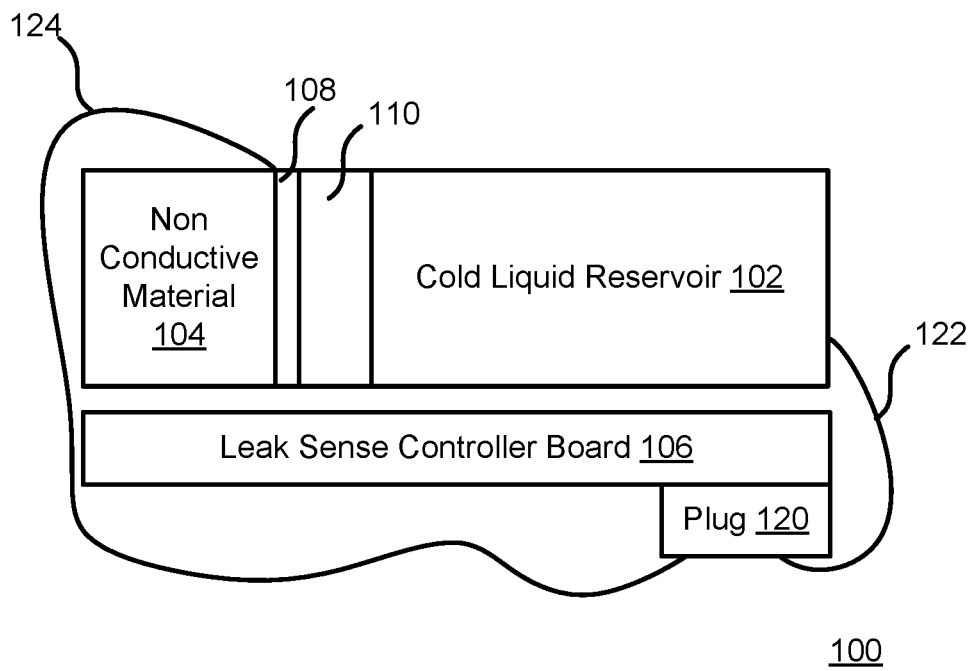

Referring to FIG. 3, cold liquid reservoir 102, non-conductive material 104, conductive component 108, and wicking material 110 may be positioned and coupled together in a substantially parallel line. In this embodiment, rigid conductive component 108 may be in physical communication with a surface of non-conductive material 104. In an example, conductive component 108 may be located a particular distance from cold liquid reservoir 102 such that the conductive component does not come in physical contact with the cold liquid reservoir. In the embodiment of FIG. 3, wicking material 110 may be in between and in physical communication with both cold liquid reservoir 102 and conductive component 108 without the use of an adhesive. In an example, wicking material 110 may fill the entire gap between cold liquid reservoir 102 and conductive component 108 so that any leaked cooling liquid may be effectively transferred from the cold liquid reservoir to the conductive component.

Figure 4:
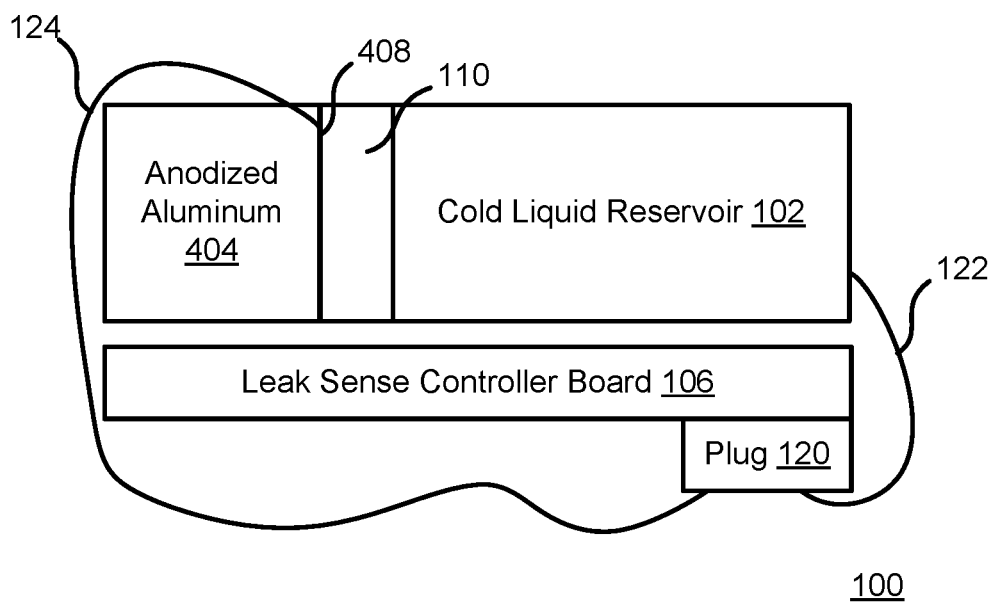

Referring to FIG. 4, non-conductive material may be anodized aluminum 404 and conductive component may be un-anodized aluminum 408. In an example, un-anodized aluminum 408 may be along an edge of anodized aluminum 404 nearest cold liquid reservoir 102. Cold liquid reservoir 102, anodized aluminum 404, un-anodized 408, and wicking material 110 may be positioned and coupled together in a substantially parallel line. In an example, un-anodized aluminum 408 may be located a particular distance from cold liquid reservoir 102 such that the conductive component does not come in physical contact with the cold liquid reservoir. In the embodiment of FIG. 4, wicking material 110 may be in between and in physical communication with both cold liquid reservoir 102 and un-anodized aluminum 408 without the use of an adhesive. In an example, wicking material 110 may fill the entire gap between cold liquid reservoir 102 and un-anodized aluminum 408 so that any leaked cooling liquid may be effectively transferred from the cold liquid reservoir to the conductive component.

Each of the embodiments of FIGS. 1-4 may detect leaked cooling liquid in substantially the same manner. For brevity and clarity, the detection of leaked cooling liquid will be described with respect to FIG. 1. As stated above, cold liquid reservoir 102 may be a cold plate to provide liquid cooling of a processor of an information handling system. In an example, if cold liquid reservoir 102 leaks cooling liquid, components below the cold liquid reservoir may be shorted. In this example, liquid cooling leak sensor unit 100 may be utilized to detect a cooling liquid leak before damage is done to one or more components of an information handling system.

In an example, leak sense controller board 106 may monitor an electrical value, such as resistance or capacitance, between cold liquid reservoir 102 and conductive component 108. In certain examples, when cold liquid reservoir 102 does not have a leak, wicking material 110 may provide an electrical barrier between the cold liquid reservoir and conductive component 108. In this situation, leak sense controller board 106 may utilize plug 120 and cables 122 and 124 to measure an electrical value across cold liquid reservoir 102 and conductive component 108. In response to leak sense controller board 106 determining or calculating one electrical value, such as a high resistance value or a high capacitance value, the leak sense controller board may determine that no cooling liquid has leaked from cold liquid reservoir 102. In an example, this electrical value may be based on wicking material 110 not having leaked cooling liquid within the material, such that the wicking material is an electrical barrier between cold liquid reservoir 102 and conductive component 108.

In certain examples, when cold liquid reservoir 102 does have a leak, wicking material 110 may transfer the leaked cooling liquid from the cold liquid reservoir to conductive component 108. In this situation, the leaked cooling liquid within wicking material 110 may provide an electrical short between cold liquid reservoir 102 and conductive component 108. In response to leak sense controller board 106 determining or calculating a change in the electrical value, such as a resistance value or a capacitance value, from the previous electrical value, the leak sense controller board may determine that cooling liquid has leaked from cold liquid reservoir 102. In an example, this electrical value may be any substantial difference in the electrical value, such as a substantial resistance or capacitance drop, based on wicking material 110 having leaked cooling liquid within the material and an electrical short being created between cold liquid reservoir 102 and conductive component 108.

Figure 5:
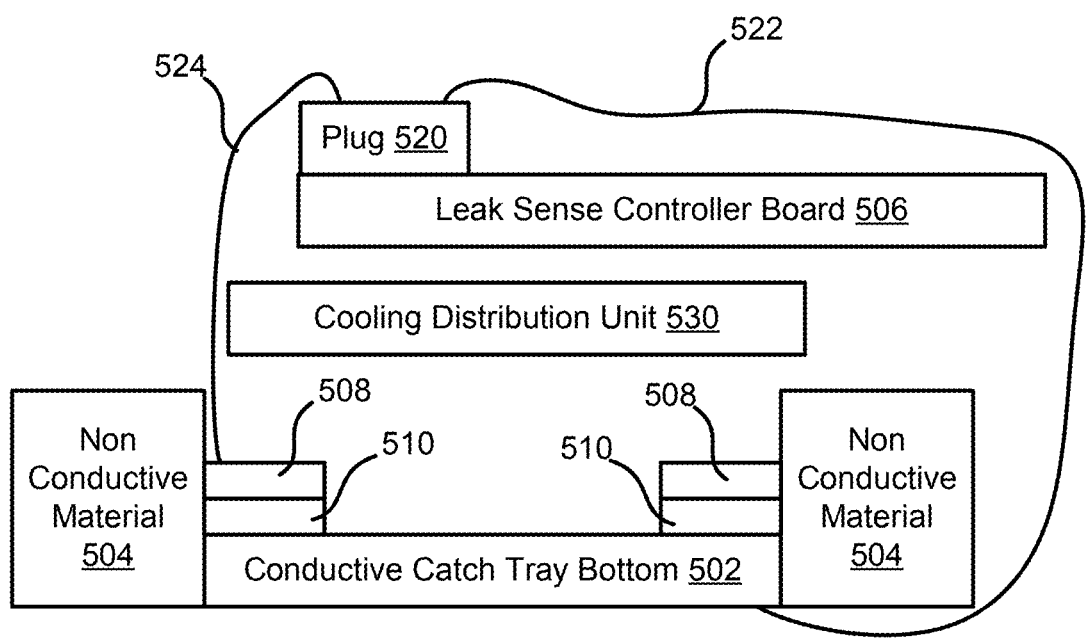
FIG. 5 is a diagram of a portion of a cooling distribution unit with a liquid cooling leak sensor according to at least one embodiment of the present disclosure.

FIG. 5 illustrates liquid cooling leak sensor unit 500 according to an embodiment of the present disclosure. Liquid cooling leak sensor unit 500 includes a conductive catch tray bottom 502, a non-conductive material 504, a leak sense controller board 506, a conductive layer 508, and a wicking material 510. Leak sense controller board 506 includes a plug 520, which in turn provides an electrical connection to conductive catch tray bottom 502 and conductive material 508. Conductive catch tray bottom 502 is electrically coupled to plug 520 via a cable 522, and rigid conductive material 508 is electrically coupled to plug 520 via a cable 524. Conductive catch tray bottom 502 may be located below a cooling distribution unit (CDU) 530 of an information handling system. In this example, conductive catch tray bottom 502 may utilized to catch cooling liquid leaking from CDU 530 to prevent the cooling liquid from damaging other components of the information handling system. In an example, if cooling liquid overflows conductive catch tray bottom 502, the leaked cooling liquid may cause components in the information handling system, such as a processor, to short.

In certain examples, when conductive catch tray bottom 502 collected leaked cooling liquid, wicking material 510 may transfer the leaked cooling liquid from the conductive catch tray bottom to conductive component 508. In this situation, the leaked cooling liquid within wicking material 510 may provide an electrical short between conductive catch tray bottom 502 and conductive component 508. In response to leak sense controller board 506 determining or calculating a change in the electrical value, such as a resistance value, from the previous electrical value, the leak sense controller board may determine that cooling liquid has leaked from conductive catch tray bottom 502. In an example, this electrical value may be any substantial difference in the electrical value, such as a substantial resistance drop, based on wicking material 510 having leaked cooling liquid within the material and an electrical short being created between conductive catch tray bottom 502 and conductive component 508.

In an example, leak sense controller board 506 may monitor an electrical value, such as resistance or capacitance, between conductive catch tray bottom 502 and conductive component 508. In certain examples, when conductive catch tray bottom 502 does not have a collection of cooling liquid, wicking material 510 may provide an electrical barrier between the conductive catch tray bottom and conductive component 508. In this situation, leak sense controller board 508 may utilize plug 520 and cables 522 and 524 to measure an electrical value across conductive catch tray bottom 502 and conductive component 508. In response to leak sense controller board 506 determining or calculating one electrical value, such as a high resistance value, the leak sense controller board may determine that no cooling liquid has leaked into conductive catch tray bottom 502. In an example, this electrical value may be based on wicking material 510 not having leaked cooling liquid within the material, such that the wicking material is an electrical barrier between conductive catch tray bottom 502 and conductive component 508.

In certain examples, when conductive catch tray bottom 502 does have leaked cooling liquid within it, wicking material 510 may transfer the leaked cooling liquid from the conductive catch tray bottom to conductive component 508. In this situation, the leaked cooling liquid within wicking material 510 may provide an electrical short between conductive catch tray bottom 502 and conductive component 508. In response to leak sense controller board 506 determining or calculating a change in the electrical value, such as a resistance value, from the previous electrical value, the leak sense controller board may determine that cooling liquid has leaked from CDU 530 into conductive catch tray bottom 502. In an example, this electrical value may be any substantial difference in the electrical value, such as a substantial resistance drop, based on wicking material 510 having leaked cooling liquid within the material and an electrical short being created between conductive catch tray bottom 502 and conductive component 508.

Figure 6:
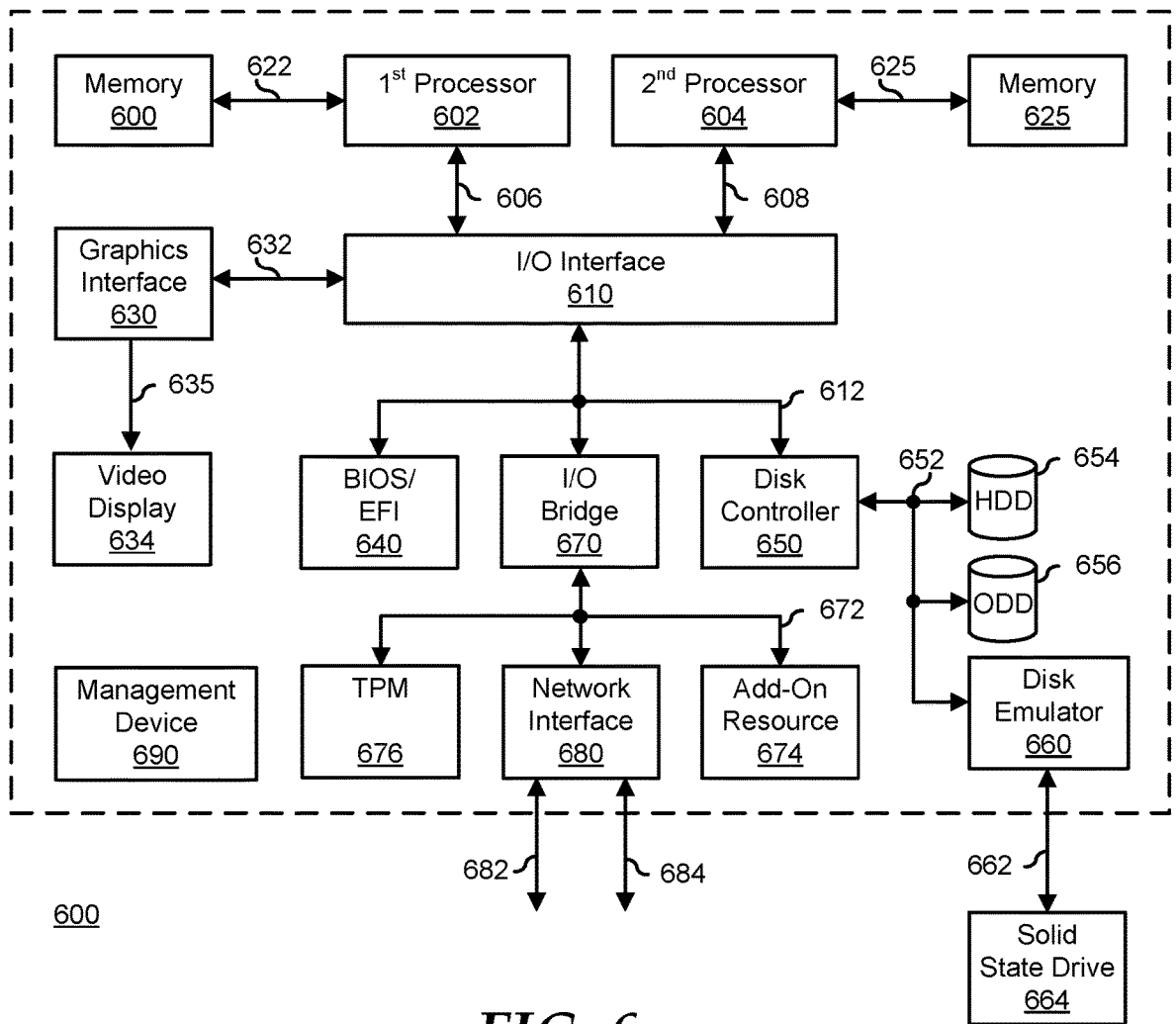
FIG. 6 is a block diagram of a general information handling system according to an embodiment of the present disclosure.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 3394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A liquid cooling leak sensor unit for an information handling system, the cold liquid cooling leak sensor unit comprising:
    a cold liquid reservoir, wherein the cold liquid reservoir is a conductive material;
    a non-conductive material in physical communication with the cold liquid reservoir, wherein the non-conductive material extends away from edges of the cold liquid reservoir for a particular distance and extends parallel with the edges of the cold liquid reservoir beyond the particular distance;
    a rigid conductive component in physical communication with the non-conductive material;
    a wicking material between and in physical communication with both the cold liquid reservoir and with the rigid conductive component, the wicking material to transfer liquid from the cold liquid reservoir to the rigid conductive component, wherein a top surface of the cold liquid reservoir and a top surface of the wicking material are flush with a top surface of the non-conductive material such that the cold liquid reservoir and the wicking material are embedded within the non-conductive material; and
    a leak sense controller board coupled to both the rigid conductive component and the cold liquid reservoir, the leak sense controller board to detect a leak in the cold liquid reservoir in response to an electrical change between the rigid conductive component and the cold liquid reservoir.

2. The liquid cooling leak sensor unit of claim 1, further comprising:
    a first cable coupled to the rigid conductive component;
    a second cable coupled to the cold liquid reservoir; and
    a plug to couple the first and second cables to the leak sense controller board.

3. The liquid cooling leak sensor unit of claim 1, wherein the cold liquid reservoir is securely mounted on the non-conductive material.

4. The liquid cooling leak sensor unit of claim 3, further comprising an adhesive located between the wicking material and the non-conductive material, wherein the adhesive holds the wicking material in physical communication with the cold liquid reservoir.

5. The liquid cooling leak sensor unit of claim 1, wherein the electrical change between the rigid conductive component and the cold liquid reservoir is created based on the liquid having a continuous connection from the cold liquid reservoir to the rigid conductive component via the wicking material.

6. An information handling system comprising:
    a processor; and
    a liquid cooling leak sensor unit including:
        a cold liquid reservoir in physical communication with the processor, the cold liquid reservoir to cool to the processor, wherein the cold liquid reservoir is a conductive material;
        a non-conductive material in physical communication with the cold liquid reservoir, wherein the non-conductive material extends away from edges of the cold liquid reservoir for a particular distance and extends parallel with the edges of the cold liquid reservoir beyond the particular distance, wherein a top surface of the cold liquid reservoir is flush with a top surface of the non-conductive material such that the cold liquid reservoir is embedded in the non-conductive material;
        a rigid conductive component in physical communication with the non-conductive material;
        a wicking material in between and in physical communication with both the cold liquid reservoir and with the rigid conductive component, the wicking material to transfer liquid from the cold liquid reservoir to the rigid conductive component; and a leak sense controller board coupled to both the rigid conductive component and the cold liquid reservoir, the leak sense controller board to detect a leak in the cold liquid reservoir in response to an electrical change between the rigid conductive component and the cold liquid reservoir.

7. The information handling system of claim 6, wherein the liquid cooling leak sensor unit further comprises:

a first cable coupled to the rigid conductive component;

a second cable coupled to the cold liquid reservoir; and a plug to couple the first and second cables to the leak sense controller board.

8. The information handling system of claim 6, wherein the cold liquid reservoir is securely mounted on the non-conductive material.

9. The information handling system of claim 8, wherein the liquid cooling leak sensor unit further comprises an adhesive located between the wicking material and the non-conductive material, wherein the adhesive holds the wicking material in physical communication with the cold liquid reservoir.

10. The information handling system of claim 6, wherein the electrical change between the rigid conductive component and the cold liquid reservoir is created based on the liquid having a continuous connection from the cold liquid reservoir to the rigid conductive component via the wicking material.

\* \* \* \* \*